Dec. 2, 1969   J. L. McMORROW ET AL   3,482,146
OVERLOAD AND HEAT PROTECTIVE APPARATUS FOR THREE-PHASE MOTORS
Filed Dec. 28, 1966

Joseph L. McMorrow,
James E. Shockroo,
     Inventors.
Koenig, Senniger, Powers and Leavitt,
     Attorneys.

United States Patent Office

3,482,146
Patented Dec. 2, 1969

3,482,146
OVERLOAD AND HEAT PROTECTIVE APPARATUS FOR THREE-PHASE MOTORS
Joseph L. McMorrow, West Bridgewater, and James E. Shockroo, South Easton, Mass., assignors to Texas Instruments Incorporated, Dallas, Tex., a corporation of Delaware
Filed Dec. 28, 1966, Ser. No. 605,343
Int. Cl. H02h 7/06, 7/08, 7/10
U.S. Cl. 317—13        2 Claims

ABSTRACT OF THE DISCLOSURE

A polyphase electric motor is protected by a device having a thermostatic switch connected in series with the operating winding of a contactor which energizes the motor. A heater is provided in connection with each phase of the motor and these heaters are supported in heat exchange relationship with the thermostatic switch but are electrically insulated therefrom so that the switch does not carry the motor currents. Overload currents drawn by the motor energize the heaters and cause the switch to deenergize the contactor and thus also the motor being protected.

BACKGROUND OF THE INVENTION

This invention relates to overload protection devices for polyphase electric motors and more particularly to such devices for the protection of such motors which are delta connected.

Many polyphase motor protection devices known heretofore have not been readily adaptable for use with delta-connected polyphase electric motors. Typically in these prior art devices, a thermostatic switch was employed which broke the power circuits to the motor windings at the neutral or common point of Y-connected motor windings and were not useful for delta-connected motors.

SUMMARY OF THE INVENTION

Among the several objects of the present invention may be noted the provision of an overload protection device which may be used for delta- and Y-connected motors; the provision of such a device which permits the use of a control circuit which is independent of the motor power circuits; the provision of such a protection device in a control circuit which protects the motor from overheating; the provision of such a device which is reliable; and the provision of such a device which is relatively simple and inexpensive. Other objects and features will be in part apparent and in part pointed out hereinafter.

Briefly, an overload protection device according to the present invention is useful in a control circuit for a polyphase electric motor in which a plurality of motor phase windings are energized from a similar plurality of supply leads through respective contacts of a control contactor, the contactor having an operating winding which, when energized, close the contacts. The protection device includes a heater connected with each one of the phase windings and a thermostatic switch having contacts connected in series with the operating winding of the control contactor. The heaters are all supported in heat exchange relationship with the thermostatic switch and are electrically insulated from each other and from the thermostatic switch so that the control circuit is independent of the motor power circuit. When overload currents are drawn by the motor windings through the heaters, the heat generated causes the thermostatic switch to be operated thereby deenergizing the contactor winding and the motor.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
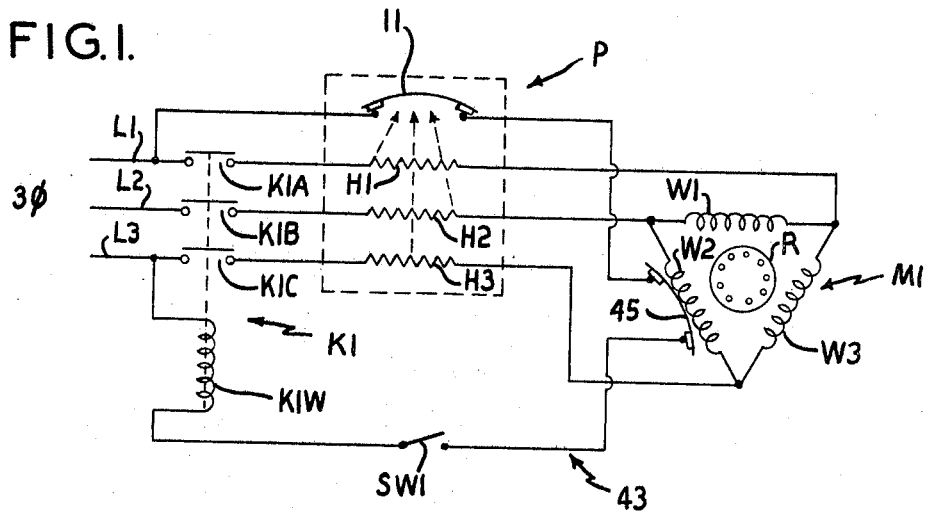
FIG. 1 is a schematic circuit diagram illustrating the connection of an overload protection device according to this invention in a control circuit for protecting a polyphase electric motor.

Referring now to FIG. 1 there is indicated generally at M1 a three-phase motor having a plurality of phase windings W1, W2, and W3 which are connected in detla. Motor M1 also includes a squirrel cage rotor R which is subject to the magnetic field developed by the windings W1–W3. As is understood by those skilled in the art, windings W1–W3 develop a rotating magnetic field which turns rotor R.

Windings W1–W3 are selectively energized from a similar plurality of supply leads L1–L3 through respective contacts K1A, K1B and K1C of a motor starting contactor K1. Contactor K1 includes an operating winding K1W which, when energized, closes the contacts K1A–K1C. Interposed in the power circuits between contacts K1A–K1C and the motor M1 is an overload protection device P made according to the present invention. Protector P comprises a snap-acting thermostatic switch 11 and three heaters H1, H2 and H3 therefor.

Figure 2:
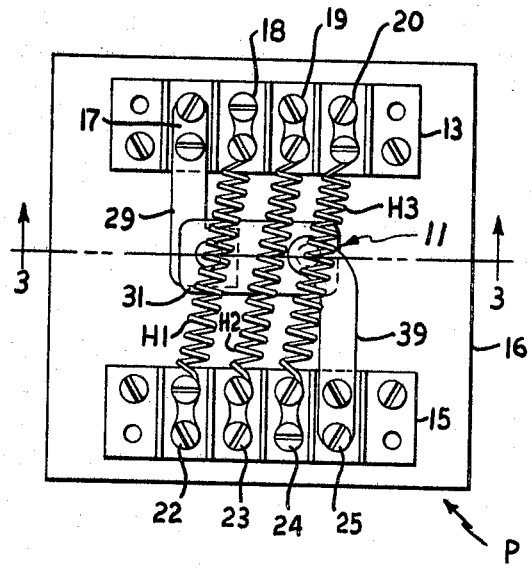
FIG. 2 is a plan view of an overload protection device employed in the circuit of FIG. 1.
Figure 3:
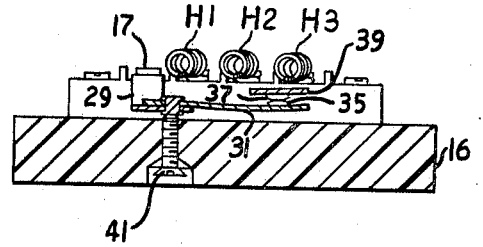
FIG. 3 is a view in section substantially on the line 3—3 of FIG. 2.

As illustrated in practical detail in FIGS. 2 and 3, protector P is an eight terminal device, the terminals being constituted by two insulating barrier strips 13 and 15 having four terminals 17–20 and 22–25 respectively. Terminal strips 13 and 15 are mounted on an insulating base 16.

One side of thermoplastic switch 11 is mounted on one end terminal 17 of barrier strip 13 and comprises a relatively rigid arm portion 29 to which is riveted an elongate bimetal plate 31. Bimetal plate 31 is deformed in known manner for snap action. The end of plate 31 which is opposite arm 29 carries a movable contact 35. Contact 35 selectively enagges a fixed contact 37 which is mounted on rigid arm 39 extending from an end terminal 25 of barrier strip 15. Under normal conditions, that is when the bimetal plate 31 is relatively cool, the contact 35 is in engagement with contact 37. However, when the plate 31 is heated, it snaps to a configuration in which contacts 35 and 37 are separated thereby opening the switched circuit. The switch may be calibrated by a screw 41 which is threaded through base 16 and adjustably deflects arm 29.

Heaters H1, H2 and H3 are formed by helical resistance elements and are connected respectively between terminals 18 and 22, between terminals 19 and 23, and between terminals 20 and 24. All of these heaters cross over the thermostat 11 and are thus in heat exchange relationship with it although electrically insulated therefrom.

As is illustrated in FIG. 1, the heaters H1–H3 are interposed between the supply leads L1–L3 and the windings of motor M1. Thus, the heat produced by these heaters varies as a function of the current drawn by the motor. Thermostatic switch 11 forms a part of a control circuit 43 which connects the operating winding K1W of contactor K1 across supply leads L1 and L3. In addition to thermostatic switch 11, control circuit 43 includes a manually operable switch SW1 and a thermostatic switch 45. Thermostatic switch 45 is embedded in and responsive to the temperature of the motor windings W1–W3. Thermostatic switch 45 is adjusted to open the control circuit when the temperature of the windings W1–W3 approaches high levels which might damage the motor.

When the mtoor M1 is cool, it may be operated normally under control of the manual switch SW1 and, under slow rates of temperature rise, thermostat 45 is operative to open the control circuit 43 thereby deenergizing the motor to prevent thermal damage. As is understood by those skilled in the art, however, protection devices such as thermostat 45 have a significant thermal inertia. Thus, under conditions of high rates of temperature rise such as under locker rotor conditions, thermostat 45 may not operate fast enough to protect the windings from thermal damage. Under such conditions, however, motor windings W1–W3 draw heavy currents from the supply leads L1–L3 and substantial heat is produced by the heaters H1–H3 which are in series with these leads. This heat is transmitted to bimetal plate 31 causing the switch 11 to open. The contactor winding K1W is thus deenergized and opens contacts K1A–K1C thereby protectively deenregizing the motor M1. Since the heater and thermostatic switch circuits are separated and insulated from each other within the protector P, it can be seen that this protector may be employde with polyphase motors having either delta- or Y-connected windings.

In view of the above it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. Overload and heat protective apparatus for a polyphase electric motor in which motor phase windings are energized from a polyphase circuit having power supply leads comprising
    a control contactor having sets of contacts, said contacts having first sides and second sides respectively, said first sides being connected to said power leads respectively, said contactor including an operating coil connected across two of said power supply leads and which when energized closes said sets of contacts,
    connections between said motor phase windings and said second sides of said sets of contacts respectively,
    an electric heater serially connected in each and every one of said connections between a respective motor phase winding and a respective one of said second sides of said sets of contacts,
    first thermostatic switch means serially connected with said operating coil in a circuit connected across two of said power supply leads, said first switch means being in heat-exchange relationship with the motor windings for opening in response to motor winding temperature reached by comparatively slow temperature rise therein and which might damage the motor,
    a single thermostatic switch in close heat-exchange relationship with all of said electric heaters also serially connected with said operating coil for opening in response to comparatively rapidly increasing temperature of any one or more of said heaters under overload current therein,
    the opening of either of said thermostatic switch means or said single thermostatic switch depriving said operating coil of current whereupon said control contactor opens.

2. A protective control circuit according to claim 1, wherein said first thermostatic switch means is embedded in the motor windings.

References Cited

UNITED STATES PATENTS

| 2,446,474 | 8/1948 | Harrold | 317—13 |
| 2,553,949 | 5/1951 | Smith | 317—46 |
| 3,064,161 | 11/1962 | Albertsson et al. | 317—13 |
| 3,141,996 | 7/1964 | McGrath | 317—46 |
| 3,302,061 | 1/1967 | Edmunds | 318—471 |

FOREIGN PATENTS 556,810   8/1932   Germany.

JOHN F. COUCH, Primary Examiner

H. I. PAUL, Assistant Examiner

U.S. Cl. X.R.

317—40; 318—453, 473, 476